United States Patent [19]

Naomi et al.

[11] 4,358,546

[45] Nov. 9, 1982

[54] SPHERICAL POROUS CROSS-LINKED COPOLYMERS OF CHLOROMETHYLSTYRENE AND DIVINYLBENZENE AND THE DERIVATIVE THEREOF

[75] Inventors: Yamaguchi Naomi, Kawasaki; Noguchi Kohji, Yokohama; Tsuzura Kazuo, Kawasaki, all of Japan

[73] Assignee: Asahi Kasei Kogyo Kabushiki Kaisha, Osaka, Japan

[21] Appl. No.: 115,862

[22] Filed: Jan. 28, 1980

[30] Foreign Application Priority Data

Feb. 9, 1979 [JP] Japan ................................. 54/13256

[51] Int. Cl.$^3$ .............................................. C08F 2/44
[52] U.S. Cl. ........................................ 521/32; 521/38; 526/201
[58] Field of Search ................... 521/38, 32; 526/201

[56] References Cited

U.S. PATENT DOCUMENTS

| | | | |
|---|---|---|---|
| 3,337,480 | 8/1967 | Small | 521/32 |
| 3,791,999 | 2/1974 | Fuchiwaki et al. | 526/201 |
| 3,843,566 | 10/1974 | Barrett | 521/32 |
| 4,104,209 | 8/1978 | Mikec et al. | 521/28 |
| 4,256,840 | 3/1981 | Meitzner et al. | 54/38 |

Primary Examiner—William F. Hamrock
Assistant Examiner—Peter F. Kulkosky
Attorney, Agent, or Firm—Sprung, Horn, Kramer & Woods

[57] ABSTRACT

A porous cross-linked copolymer of chloromethylstyrene and divinylbenzene having a divinylbenzene unit represented by Xm of from about 9.0 percent by mole to about 17.0 percent by mole based on the total moles of monomer units; a content of active chlorine atom of from about 5.25–0.08 Xm mmole/g-dry resin to about 6.43–0.10 Xm mmole/g-dry resin; a water regain of from about 0.10 ml/g-dry resin to about 1.20 ml/g-dry resin; and a total volume of micro pores having a diameter of from about 500 angstroms to about 3000 angstroms of from 0.10 ml/g-dry resin to about 1.20 ml/g-dry resin; and a porous iminodiacetic acid type chelating resin having a Xm of from about 9.0 percent by mole to about 17.0 percent by mole based on the total moles of all monomer units; an ion exchange capacity of from about 5.35–12.0 Xm/(205.6–1.30 Xm) meq/g-dry resin to about 7.93–18.1 Xm/(247.1–2.0 Xm) meq/g-dry resin; a water regain of from about 0.60 ml/g-dry resin to about 2.20 ml/g-dry resin; and the total volume of micro pores having a diameter of from about 500 angstroms to about 3000 angstroms of from about 0.05 ml/g-dry resin to about 0.60 ml/g-dry resin.

6 Claims, No Drawings

SPHERICAL POROUS CROSS-LINKED COPOLYMERS OF CHLOROMETHYLSTYRENE AND DIVINYLBENZENE AND THE DERIVATIVE THEREOF

BACKGROUND OF THE INVENTION

1. Field of the Invention

The present invention relates to a porous cross-linked copolymer and its derivative, and to a process for their production. More particularly, it relates to a porous cross-linked copolymer of chloromethylstyrene and divinylbenzene and a porous iminodiacetic acid type chelating resin, and to a process for their production.

2. Description of the Prior Art

Porous cross-linked copolymer having reactive chloromethyl groups have been produced by a process comprising copolymerizing styrene and divinylbenzene, and then chloromethylating the polymerized product.

But this process employs, as an essential reagent, chloromethyl methyl ether which has suspision of a cancer-causing compound and accordingly, requires severe restrictions on safety and protective equipment. Furthermore, it is difficult to strictly control the chemical structure since the side reaction of forming secondary cross-linking occurs in addition to the desired introduction of chloromethyl groups.

On the other hand, Japanese Patent Application (OPI) No. 3187/1975 and Japanese Patent Application (OPI) No. 47090/1977 disclose processes which employ chloromethylstyrene as the starting material and have dissolved the problem of forming secondary cross-linking. However, the derivative having properties sufficient for practical uses cannot be obtained.

Various kinds of functional polymers, for example, strongly basic anion exchange resins, weakly basic anion exchange resins, chelating resins and redox resins are synthesized from the intermediate, i.e. the cross-linked copolymer having reactive chloromethyl groups. Some of them are commercially available.

The representative example of them is a chelating resin where an iminodiacetic acid group [$CH_2N(CH_2COOH)_2$] is introduced to the methylene group bonded with the skeletal aromatic nuclus. This iminodiacetic acid type chelating resin is one kind of weakly acidic ion exchange resins and has a greater swelling ratio than that of other strongly acidic ion exchange resins and other strongly basic ion exchange resins. In this connection, for example, the swelling ratio is about 1.40 to about 1.90 as the volume ratio of H type to Na type with iminodiacetic acid type chelating resins which are commercially available; about 1.03 to about 1.11 as the volume ratio of Na type to H type with strongly acidic ion exchange resins; and about 1.10 to about 1.25 as the volume ratio of Cl type of OH type with strongly basic ion exchange resins. Generally, with greater swelling ratios, the strength of the resin decreases and various disadvantages at practical operation such as a large consumption of resin are brought about.

Thus, a chelating resin having a small swelling ratio and a high mechanical strength is desired for a process using a packed column or using a strongly electrolytic solution. Some kinds of iminodiacetic acid type chelating resins are commercially available, but they are not satisfactory for the industrial use.

SUMMARY OF THE INVENTION

Accordingly, the present invention in one embodiment provides a porous cross-linked copolymer of chloromethylstyrene and divinylbenzene having a divinylbenzene unit represented by Xm of from about 9.0 percent by mole to about 17.0 percent by mole based on the total moles of all the monomer units; a content of active chlorine atom of from about 5.25–0.08 Xm mmole/g-dry resin to about 6.43–0.10 Xm mmole/g-dry resin; a water regain of from about 0.10 ml/g-dry resin to about 1.20 ml/g-dry resin; and a total volume of micro porous having a diameter of from about 500 angstroms to about 3000 angstroms of from 0.10 ml/g-dry resin to about 1.20 ml/g-dry resin.

The present invention in another embodiment provides a method of producing the porous cross-linked copolymer as described above which comprises polymerizing a monomer mixture containing about 9.0 percent by mole to about 17.0 percent by mole, based on the total moles of all the monomers, of divinylbenzene, about 80–1.39 Xm percent by mole to about 98–1.71 Xm percent by mole, based on the total moles of all the monomers, of chloromethylstyrene, about 50 percent by weight to about 120 percent by weight, based on the total weight of all the monomers, of a water-insoluble organic medium which precipitates the polymerized product and about 1 percent by weight to about 7.5 percent by weight, based on the total weight of all the monomers, of a linear polymer which is soluble in the said monomers and the organic medium and then removing unreacted components from the polymerized product.

In a further embodiment, the present invention provides a porous iminodiacetic acid type chelating resin having a divinylbenzene unit represented by Xm of from about 9.0 percent by mole to about 17.0 percent by mole based on the total moles of all the monomer units; an ion exchange capacity of from about 5.35–12.0 Xm/(205.6–1.30 Xm) meq/g-dry resin to about 7.93–18.1 Xm/(247.1–2.0 Xm) meq/g-dry resin; a water regain of from about 0.60 ml/g-dry resin to about 2.20 ml/g-dry resin; and a total volume of micro pores having a diameter of from about 500 angstroms to about 3000 angstroms of from about 0.05 ml/g-dry resin to about 0.60 ml/g-dry resin.

In an even further embodiment, the present invention provides a method of producing the porous iminodiacetic acid type chelating resin as described above which comprises reacting the above described cross-linked copolymer of chloromethylstyrene and divinylbenzene with an ester of iminodiacetic acid and hydrolyzing the reaction product.

DETAILED DESCRIPTION OF THE INVENTION

The skeleton of the cross-linked copolymer of chloromethylstyrene and divinylbenzene comprises main units formed by reacting chloromethylstyrene monomer with divinylbenzene monomer.

The skeleton of the cross-linked copolymer according to this invention may contain units of other vinyl monomers than chloromethylstyrene and divinylbenzene including, for example, monovinyl aromatic compound such as dichloromethylstyrene, α-chloromethylstyrene, ethylvinylbenzene and methylvinylbenzene, acrylonitrile and esters of acrylic acid or methacrylic acid in such amount as not to change the properties of the cross-linked copolymer.

It is preferred that highly pure chloromethylstyrene and highly pure divinylbenzene are employed in this invention. The pure chloromethylstyrene and divinylbenzene which are contained in commercial available chloromethylstyrene and divinylbenzene may be a mixture with the meta- and/or para- isomers. In this invention, the mixture with the meta- and/or para- isomer can also is employed. The chloromethylstyrene used in this invention preferably contains more than about 80 percent by weight, and more preferably more than about 85 percent by weight of pure chloromethylstyrene.

The chloromethylstyrene of this invention can be prepared by known methods as described in U.S. Pat. Nos. 2,981,758 and 2,780,604. Commercial available chloromethylstyrenes and divinylbenzenes can also be used in this invention.

The divinylbenzene unit in the cross-linked copolymer represented by Xm which can be defined by the formula given below is typically about 9.0 percent by mole to about 17.0 percent by mole, preferably about 10.0 percent by mole to about 16.0 percent by mole, and more preferably about 11.0 percent by mole to about 15.0 percent by mole based on the total moles of all the monomers employed in the production of the cross-linked copolymer.

$$Xm = DVBm/(CMSm + DVBm + EVBm) \times 100$$

In the above described formula, DVBm indicates a mole amount of pure divinylbenzene; CMSm a mole amount of pure chloromethylstyrene; and EVBm a mole amount of vinyl monomers other than pure divinylbenzene and pure chloromethylstyrene.

When the amount of Xm is less than about 9.0 percent by mole, the strength of the porous polymer obtained is decreased and swelling ratio of the derivatives obtained from the porous cross-linked copolymer is increased. On the other hand, when the Xm is more than about 17.0 percent by mole, the chloromethylstyrene units in the porous cross-lined copolymer are decreased too much for introduction of ion exchange groups therein the accordingly, the ion exchange capacity of the derivative of the porous cross-linked copolymer is decreased.

The content of active chlorine atom in this invention represents an amount of chlorine atoms by millimole which are bonded to the aromatic nuclei through the methylene groups in the dry porous cross-linked copolymer of chloromethylstyrene and divinylbenzene per gram of the dry porous cross-linked copolymer.

The content of active chlorine atom can be determined by measuring an anion exchange capacity of the strongly basic anion exchange resin having been obtained by reacting a predetermined amount of the cross-linked copolymer of chloromethylstyrene and divinylbenzene with trimethylamine.

The ion exchange capacity can be measured in accordance with the methods as described in Honda, Yoshino and Kakibana, *Ion Exchange Resin*, Hirokawa Shoten.

When the content of active chlorine atom is less than about 5.25–0.08 Xm mmole/g-dry resin, the ion exchange capacity of the derivative of the porous cross-linked copolymer is decreased. Also, it becomes difficult to produce the cross-linked copolymer having more than 6.43–0.10 Xm mmole/g-dry resin of the content of active chlorine atom since highly pure chloromethylstyrene and highly pure divinylbenzene are necessary. The content of active chlorine atom according to this invention preferably ranges from about 5.44–0.08 Xm mmole/g-dry resin to about 6.36–0.10 Xm mmole/g-dry resin, and more preferably from about 5.57–0.08 Xm mmole/g-dry resin to about 6.30–0.09 Xm mmole/g-dry resin.

The water regain of the porous cross-linked copolymer represents a volume of water retained in the porous cross-linked copolymer by milliliter when one gram of the dry cross-linked copolymer becomes equilibrated with water and the water regain is an index of porosity of the porous cross-linked copolymer in water. The water regain represented by $W_R$ is defined by the following formula;

$$W_R = \frac{(W_1 - W_2) - 0.036\frac{W_2}{d}}{W_2}$$

wherein $W_1$ indicates a weight of the porous cross-linked copolymer having water retained therein after removal of water adhered onto its surface by centrifugation; $W_2$ a weight of the dry porous cross-linked copolymer; and d a true density of the porous cross-linked copolymer. The water regain depends on the hydrophilicity of resins. Generally, the water regain of a hydrophilic resin is higher than that of a hydrophobic resin.

When the water regain is less than about 0.10 ml/g-dry resin, swelling ratio of the derivatives obtained from the porous cross-linked copolymer is increased. On the other hand, when the water regain is more than about 1.20 ml/g-dry resin, the strength of the porous cross-linked copolymer is disadvantageously decreased. Thus, it is preferred that the water regain of the porous cross-linked copolymer of chloromethylstyrene and divinylbenzene according to this invention typically ranges from about 0.20 ml/g-dry resin to about 1.00 ml/g-dry resin. A more preferred water regain ranges from about 0.30 ml/g-dry resin to about 0.90 ml/g-dry resin.

The diameter and the volume of micro pores of the porous cross-linked copolymer of chloromethylstyrene and divinylbenzene can be measured by a mercury penetration porosimeter (manufactured by Micromeritics Instrument Corporation; Shimazu-Micromeritics Type: Mercury Penetration Porosimeter 905-1).

The principle of measurement by Mercury Penetration is described in Oishi and Tsunoda, *Surface Chemistry of Fine Particles*, The Nikkan Kogyo Shimbun, and Clyde Orr Jr. and J. M. Dallavalls, *Fine Particle Measurement*, The Macmillan Company, New York (1959).

The total volume of micro pores having a diameter of about 500 angstroms to about 3000 angstroms is in the rante of from about 0.10 ml/g-dry resin to about 1.20 ml/g-dry resin, preferably from about 0.20 ml/g-dry resin to about 1.00 ml/g-dry resin, and more preferably from about 0.30 ml/g-dry resin to about 0.90 ml/g-dry resin. When the total volume of micro pores having a diameter of about 500 angstroms to about 3000 angstroms is less than about 0.10 ml/g-dry resin, the swelling ratio of the derivative of the porous cross-linked copolymer such as an ion exchange resin is increased, and the reaction rate of the derivative is retarded. On the other hand, when the total volume of micro pores having a diameter of about 500 angstroms to about 3000 angstroms is more than about 1.20 ml/g-dry resin, the strength of the porous cross-linked copolymer and the derivative thereof is disadvantageously decreased. Furthermore, when the porous cross-linked copolymer has only pores having a diameter of less than 500 angstroms, the swelling ratio of the derivative thereof is increased, and when the porous cross-linked copolymer has only pores having a diameter of more than 3000 angstroms, the strength of the derivative thereof is decreased.

The form of the porous cross-linked copolymer of chloromethylstyrene and divinylbenzene of this invention is preferably of a bead form. The volume mean particle diameter of the porous cross-linked copolymer is preferably about 0.23 mm to about 0.70 mm. The volume mean particle diameter is denoted by the size of a sieve on which 50 percent of the copolymer equilibrated with water remains after sieving. When the volume mean particle diameter is less than about 0.23 mm, a pressure drop is increased in using the derivatives thereof in a column, and part of the derivative is washed away at back-washing. On the other hand, when the volume mean particle diameter is more than about 0.70 mm, the reaction rate in producing the derivative is decreased. The uniformity coefficient of the porous cross-linked copolymer is preferably about 1.80 or less. The uniformity coefficient is denoted by the ratio of the size of a sieve on which about 90 percent of the copolymer remains after sieving to the size of a sieve on which about 40 percent of the copolymer remains after sieving. When the uniformity coefficient is more than about 1.80, disadvantages such as the pressure drop, the washing away and others are brought about since particles of a small size and particles of a large size are mixed in the column.

The porous cross-linked copolymer according to this invention is produced by a process which comprises polymerizing a monomer mixture containing chloromethylstyrene, divinylbenzene, a water-insoluble organic medium which precipitates the polymerized product of chloromethylstyrene and divinylbenzene and a linear polymer which is soluble in the monomer mixture in the presence of a radical initiator in an aqueous medium containing a suspension stabilizer, and removing unreacted components, i.e. the water-insoluble organic medium from the polymerized product with a suitable extractor.

The chloromethylstyrene which can be employed in the process of this invention contains, as described above, preferably more than about 80 percent by weight and more preferably more than about 85 percent by weight of a pure chloromethylstyrene. It is preferred that the purity of chloromethylstyrene is higher. Commercial available chloromethylstyrene which contains monovinyl aromatic compounds other than pure chloromethylstyrene, i.e. dichloromethylstyrene and/or α-chloromethylstyrene can also be employed.

The divinylbenzene which can be employed in the process of this invention, as described above, contains preferably more than 56 percent by weight of pure divinylbenzene. In the process of this invention, it is preferred that the purity of divinylbenzene is higher. The pure chloromethylstyrene and the pure divinylbenzene which can be employed may be mixture with the meta- and/or the para- isomer.

The amount of divinylbenzene which can be employed in the process of this invention and represented by the same Xm as the divinylbenzene unit in the porous cross-linked copolymer is about 9.0 percent by mole to about 17.0 percent by mole based on the total moles of all the monomers.

When the Xm is less than about 9.0 percent by mole or more than about 17.0 percent by mole, the above described disadvantages occur with the cross-linked copolymer obtained. The Xm is preferably in the range of from about 10.0 percent by mole to about 16.0 percent by mole, and more preferably from about 11.0 percent by mole to about 15.0 percent by mole.

The amount of chloromethylstyrene employed in the process of this invention is about 80–1.39 Xm percent by mole to about 98–1.71 Xm percent by mole based on the total moles of all the monomers. When the amount of chloromethylstyrene is less than 80–1.39 Xm percent by mole, the density of functional groups of the derivative of the porous cross-linked copolymer is decreased. On the other hand, when the amount of chloromethylstyrene is more than 98–1.71 Xm percent by mole, highly pure chloromethylstyrene and highly pure divinylbenzene are necessary to produce the porous cross-linked copolymer. The amount of chloromethylstyrene is preferably about 83–1.45 Xm percent by mole to about 97–1.69 Xm percent by mole, and more preferably from about 85–1.50 Xm percent by mole to about 96–1.60 Xm percent by mole.

The water-insoluble organic medium which precipitates the polymerized product means an organic medium which does not substantially swell the polymerized cross-linked copolymer of chloromethylstyrene and divinylbenzene, and organic esters are suitable as the water-insoluble organic media in this invention. Examplary water-insoluble organic media which can be employed in the polymerization include, for example, dioctyl phtalate, dibutyl sebacate, dibutyl azelate, dibutyl adipate, tributyl citeate, dihexyl sebacate, dihexyl azelate, dihexyl adipate, dioctyl sebacate, dioctyl azelate and dioctyl adipate. Of these organic esters, tributyl citrate, dioctyl azelate, dioctyl adipate and dioctyl citrate, are more preferred. The amount of the water-insoluble organic medium employed in this invention is about 50 parts by weight to about 120 parts by weight, preferably about 60 parts by weight to about 100 parts by weight and a more preferred amount is about 65 parts by weight to about 90 parts by weight based on 100 parts by weight of the total amount of chloromethylstyrene and divinylbenzene. When the amount of the water-insoluble organic medium is less than 50 parts by weight, the swelling ratio of the derivative of the cross-linked copolymer obtained is increased, and the reaction rate of producing the derivative is decreased. On the other hand, when the amount of the water-insoluble organic medium is more than 120 parts by weight, the strength of the derivative of the cross-linked copolymer is decreased.

The linear polymers which are soluble in the monomer mixture can be employed in the process of this invention and include, for example, polystyrene, polymethyl methacrylate and polyvinyl acetate and of these linear polymers, polystyrene is preferred.

The amount of the linear polymer employed is about 1 part by weight to about 7.5 parts by weight based on 100 parts by weight of the total amount of chloromethylstyrene and divinylbenzene. A preferred amount of the linear polymer is about 1 part by weight to about 7.0 parts by weight, and a more preferred amount is about 2 parts by weight to about 7.0 parts by weight. When the amount of the linear polymer is more than about 7.5 parts by weight, the strength of the derivative of the cross-linked copolymer is decreased.

The radical initiators which can be employed in the polymerization include, for example, peroxide compounds such as benzoyl peroxide, lauroyl peroxide and tert-butyl hydroperoxide, and azo-compounds such as azobisisobutyronitril. The amount of the radical initiator employed in this invention ranges from about 0.3 parts by weight to about 3 parts by weight based on 100 parts by weight of the total amount of chloromethylstyrene and divinylbenzene.

The suspension stabilizers which can be employed in the polymerization include, for example, water-soluble organic compounds such as methyl cellulose, carboxy methyl cellulose; sparingly water-soluble inorganic compounds such as calcium phosphate; and water-soluble inorganic salts such as sodium chloride.

The method for the suspension polymerization comprises adding a monomer mixture containing chloromethylstyrene, divinylbenzene, a water-insoluble organic medium and a radical initiator as an oil phase to an aqueous medium containing a suspension stabilizer as an aqueous phase, forming spherical oil phases by stirring the resulting mixture and then polymerizing the chloromethylstyrene and the divinylbenzene at elevated temperatures.

The diameter os the spherical oil phases can be controlled by conventional methods such as the selection of the suspension stabilizer and the change in revolutions at stirring.

The polymerization is started by elevating the temperature of the suspension.

The polymerization temperature is determined according to kinds of radical initiators, and generally is in the range of from about 50° C. to about 100° C. The polymerization is continued at the temperature until the polymerization ratio of monomers reaches a desirable value, and the polymerization time is preferably for about 3 hours to about 25 hours.

After the polymerization, the polymerized product is separated from the aqueous phase by filtration and the product separated is sufficiently washed with water to remove the suspension stabilizer. This washing with water is conducted by adding the product in water in an amount 5 times the volume of the product, stirring the mixture and separating the product from water by filtration.

After the washing with water, the product is dried at a temperature of 60° C. or less, and preferably by air-dried.

After the drying, unreacted components are removed from the product with an extracting reagent such as dichloroethane, chloroforme and acetone by a Soxhlet's extractor or they are removed by adding the product in such an extracting reagent as described above in an amount at least 10 times the volume of the product, stirring the mixture at a temperature of from about 20° C. to about 40° C. for about 3 hours to about 4 hours, and then separating the product from the extracting reagent by filtration, and these procedures are repeated 3 to 4 times.

After the extraction, the drying of the product may be carried out, if necessary.

The iminodiacetic acid type chelating resin of this invention is produced by substituting iminodiacetic acid groups for part or all of the active chlorine atoms of the porous cross-linked copolymer of chloromethylstyrene and divinylbenzene.

Thus, the divinylbenzene unit of the iminodiacetic acid type chelating resin based on the total moles of all the monomer units, the same as that of the porous cross-linked copolymer of chloromethylstyrene and divinylbenzene, which is the precursor of the chelating resin according to this invention, and can be represented by $X_m$.

The skeleton of the iminodiacetic acid type chelating resin according to the present invention may contain units obtained from vinyl monomers other than chloromethylstyrene and divinylbenzene in such an amount not as to change the properties of the iminodiacetic acid type chelating resin. The para- or meta- isomers of chloromethylstyrene and divinylbenzene can also be used for the skeleton of the iminodiacetic acid type chelating resin of this invention.

The divinylbenzene unit $X_m$ according to this invention is about 9.0 percent by mole to about 17.0 percent by mole based on the total moles of all the monomers. When the $X_m$ is less than 9.0 percent by mole and more than 17.0 percent by mole, the same disadvantages as seen with the cross-linked copolymer of chloromethylstyrene and divinylbenzene are brought about. The $X_m$ is preferably about 10.0 percent by mole to about 16.0 percent by mole, and more preferably about 11.0 percent by mole to about 15.0 percent by mole.

The ion exchange capacity of the iminodiacetic acid type chelating resin according to this invention is about $5.35-12.0 X_m/(205.6-1.3 X_m)$ meq/g-dry resin to about $7.93-18.1 X_m/(247.1-2.0 X_m)$ meq/g-dry resin. When the ion exchange capacity is less than $5.35-12.0 X_m/(205.6-1.3 X_m)$ meq/g-dry resin, the number of the functional groups for forming the chelate bonding is small and accordingly, a large amount of the chelating resin is required for practical purposes and the reaction rate is decreased. On the other hand, when the ion exchange capacity is more than $7.93-18.1 X_m/(247.1-2.0 X_m)$ meq/g-dry resin, highly pure chloromethylstyrene and highly pure divinylbenzene are necessary to produce the chelating resin. A preferred ion exchange capacity of the iminodiacetic acid type chelating resin is about $5.56-12.7 X_m/(208.5-1.4 X_m)$ meq/g-dry resin to about $7.78-17.7 X_m/(244.2-2.0 X_m)$ meq/g-dry-resin, a more preferred ion exchange capacity is about $5.63-12.9 X_m/(209.4-1.4 X_m)$ meq/g-dry resin to about $7.52-18.1 X_m/(239.4-1.8 X_m)$ meq/g-dry resin.

The water regain of the chelating resin is defined by the same formula as with the cross-linked copolymer of chloromethylstyrene and divinylbenzene as described above by using the Na type resin. The water regain of the chelating resin according to this invention is about 0.60 ml/g-dry resin to about 2.20 ml/g-dry resin, preferably about 0.70 ml/g-dry resin to about 2.00 ml/g-dry resin and more preferably about 0.80 ml/g-dry resin to about 1.80 ml/g-dry resin. When the water regain is less than about 0.60 ml/g-dry resin, swelling ratio is increased. On the other hand, when the water regain is more than about 2.20 ml/g-dry resin, the strength of the chelating resin is disadvantageously decreased.

The diameter and the volume of micro pore of the chelating resin of this invention can also be measured by using the Na type resin in the same method as employed for the porous cross-linked copolymer of this invention.

The total volume of micro pores having a diameter of about 500 angstroms to about 3000 angstroms of the chelating resin of this invention is about 0.05 ml/g-dry resin to about 0.60 ml/g-dry resin, and preferably about 0.10 ml/g-dry resin to about 0.50 ml/g-dry resin, and more preferably about 0.15 ml/g-dry resin to about 0.48 ml/g-dry resin. When the total volume of micro pores having a diameter of about 500 angstroms to about 3000 angstroms is less than about 0.05 ml/g-dry resin, the swelling ratio of the chelating resin is increased and the reaction rate in the production of the chelating resin is low. On the other hand, when the total volume of micro pores having a diameter of about 500 angstroms to about 3000 angstroms is more than about 0.60 ml/g-dry resin, the strength of the chelating resin is disadvantageously decreased. Furthermore, when the porous cross-linked copolymer has only pores having a diameter of less than 500 angstroms, the swelling ratio of the derivative thereof is increased, and when the porous cross-linked copolymer has only pores having a diameter of more than 3000 angstroms, the strength of the chelating resin is decreased.

The form of the iminodiacetic acid type chelating resin according to this invention is of a bead form having a volume mean particle diameter as the Na type resin of from about 0.30 mm to about 0.90 mm and the uniformity coefficient thereof is about 1.80 or less. When the volume average particle diameter is less than about 0.30 mm, the pressure drop is increased in using the resin in a column, and part of the resin is washed away at back-washing. On the other hand, when the volume mean particle diameter is more than about 0.90 mm, the reaction rate is decreased. When the uniformity coefficient is more than about 1.80, disadvantages such as the pressure drop, the washing away and others are brought about since particles of a small size and a large size particles are mixed in the column. The volume mean particle diameter and the uniformity coefficient of the chelating resin are measured by using the Na resin in the same methods as those for the porous cross-linked copolymer.

The iminodiacetic acid type chelating resin according to this invention can be produced by a process comprising reacting an ester of iminodiacetic acid with the porous cross-linked copolymer of chloromethylstyrene and divinylbenzene according to this invention to introduce the ester group of iminodiacetic acid to the porous cross-linked copolymer and then hydrolyzing the ester group.

The introduction of the iminodiacetic acid group to the cross-linked copolymer can be conducted in the presence of the cross-linked copolymer and an excess amount of the ester of iminodiacetic acid.

It is preferred to react the ester of iminodiacetic acid with the cross-linked copolymer in a reaction medium whose pH is kept at about 9 to about 4, preferably from about 8 to about 5 by using a neutralization agent in order to avoid the excessive use of the ester of iminodiacetic acid and to effectively use the ester of iminodiacetic acid, for example, as described in Japanese Patent Application [OPI] Nos. 22,092/1977 and 121,897/1978.

Other conventional methods of introducing iminodiacetic acid groups to the cross-linked copolymer by using sodium iminodiacetate or introducing a hydrophilic group before using the sodium iminodiacetate are described in U.S. Pat. Nos. 3,337,479 and 3,337,480 and a method of introducing the group by using iminodiacetonitrile and then hydrolyzing the reaction product is also described in YE. B. Trostyanskaya and G. Z. Nefedova, *Vysokomolekul Soedin.* 5, No. 1, 49–56 (1963). According to these method, however, the chelating resin having good properties cannot be obtained since the rate of introduction of iminodiacetic acid groups cannot be increased.

Suitable examples of the ester of iminodiacetic acid include methyl iminodiacetate, ethyl iminodiacetate, propyl iminodiacetate and butyl iminodiacetate. The amount of the ester of imino diacetic acid which can be employed in this invention is about 0.8 times by mole to about 3.0 times by mole the amount of active chlorine atom, and preferably about 0.9 times by mole to about 2.5 times by mole the amount of active chlorine atom.

Any reaction medium capable of dissolving the ester of iminodiacetic acid can be employed in this invention. Suitable examples of the reaction medium include benzene, toluene, xylene, chloroform, dichloroethane, methylene chloride, acetone, tetrahydrofuran, methanol, ethanol, propanol, butanol, N,N-dimethylformamide and water. Of these reaction media, water is preferred. The amount of the reaction medium which can be employed in this invention is preferably about 3 times to about 6 times the weight of the ester of iminodiacetic acid.

Suitable examples of the neutralization agent which can be employed in this invention include caustic alkalis, and carbonates such as sodium bicarbonate and sodium carbonate. The amount of the neutralization agent which can be employed in this invention is preferably about 0.9 times to about 1.1 times the equivalent of the ester of iminodiacetic acid.

The reaction conditions of this invention may be chosen according to kinds of the esters of iminodiacetic acid employed and the reaction medium selected. The reaction temperature typically ranges from about 60° C. to about 130° C., preferably from about 65° C. to about 100° C. and the time of reaction time typically ranges from about 8 hours to about 30 hours.

The ester group of iminodiacetic acid of the porous cross-linked copolymer of chloromethylstyrene and divinylbenzene which has been introduced by the above described process can be hydrolized by the aqueous reaction with an acid such as hydrochloric acid and sulfuric acid or an alkali such as sodium hydroxide at a reaction temperature ranging from about 60° C. to about 100° C. for a reaction time ranging from about 3 hours to about 30 hours.

The porous cross-linked copolymer of chloromethylstyrene and divinylbenzene according to this invention has a wide range of use such as intermediates of chelating resins, intermediates of anion exchange resins or redox resins, basic materials for Merrifield synthesis and organic catalysts.

The porous iminodiacetic acid type chelating resin can be employed in various kinds of processes such as a process removing polyvalent metal ions from brine employed in the electrolysis of brine, a process removing heavy metal ions from amino acids and a process removing heavy metal ions from waste liquid.

The present invention will now be illustrated in more detail by several non-limiting examples.

The methods for measuring the strength and the reaction rate of the chelating resin which are employed in the following examples are as follows.

100 ml of non-cracked spherical chelating resins of H type having a diameter of 0.42 mm to 0.59 mm which have been packed into a column having an inside diameter of 28 mm and a length of 1.2 m are back-washed with water for 5 minutes and left to stand for 2 minutes. Then an aqueous solution of 0.8 N of hydrochloric acid is passed through the column for 10 minutes, water for 10 minutes for washing the resins and subsequently an aqueous solution of 0.8 N of sodium hydroxide for 10 minutes. Finally, the resins are washed with water for 13 minutes. This whole procedure is repeated 145 times and the passing of liquid is conducted at a linear rate of 400 m/hour at room temperature. The strength of the chelating resin is denoted by the amount of the non-cracked spherical chelating resin after the treatment as described above.

The reaction rate according to this invention is indicated as the amount of the calcium ion adsorbed on the chelating resin after passing a 5 N aqueous sodium hydroxide solution containing 20 ml/g of calcium ion and having a pH of 9 through a column having an inside diameter of 9 mm and a length of 100 mm which has been packed with 5 ml of non-cracked spherical chelating resin of Na type having a diameter of 0.59 mm at a linear rate of 0.4 m/hour and at room temperature for one hour.

The swelling ratio according to this invention is indicated as the volume ratio of the volume of the above described H type resin in pure water having a pH of 7 to that of the above described Na type resin in an aqueous sodium hydroxide solution having pH of 12.

EXAMPLE 1

Into a four necked flask equipped with stirrer, thermometer and reflex condenser was added a suspension where 3 g of sodium carboxymethyl cellulose and 233 g of sodium chloride were dissolved in 100 ml of pure water, and then to the suspension was added a monomer mixture comprising 177.5 g of technical chloromethylstyrene containing 94 percent by weight of pure chloromethylstyrne, 3 percent by weight of α-methylstyrene and 3 percent by weight of dichloromethylstyrene, 42.5 g of technical divinylbenzene containing 57 percent by weight of pure divinylbenzene and impurities substantially consisting of ethylvinylbenzene, 145.2 g of dioctyl sebacate, 4.5 g of polystyrene and 2.2 g of benzoyl peroxide.

Then the suspension was stirred in order to form beads having a diameter of from 0.1 mm to 0.9 mm, and was polymerized at a temperature of 80° C. for 16 hours with stirring. The polymerized product was washed with water and dried at room temperature and then treated with dichloroethane by a Soxhlet's extractor to remove unreacted components including polystyrene, and finally was dried. As a result, were obtained 180 g of a porous cross-linked copolymer having a content of active chlorine atom of 4.99 mmole/g-dry resin, a water regain of 0.35 ml/g-dry resin and a total volume of micro pores having a diameter of from about 500 angstroms to about 3000 angstroms of 0.32 ml/g-dry resin.

EXAMPLE 2

The same procedure of Example 1 was repeated except that a monomer mixture consisting of 177.5 g of the same technical chloromethylstyrene as in Example 1, 42.5 g of the same technical divinylbenzene as in Example 1, 165 g of dioctyl adipate, 10 g of polystyrene and 2.2 g of benzoyl peroxide was employed as the monomer mixture.

As a result, was obtained a porous cross-linked copolymer having a content of active chlorine atom of 5.03 mmole/g-dry resin, a water regain of 0.52 ml/g-dry resin and a total volume of micro pores having a diameter of from about 500 angstroms to about 3000 angstroms of 0.47 ml/g-dry resin.

EXAMPLE 3

The same procedure of Example 1 was repeated except that the monomer mixture consisting of 177.5 g of the same technical chloromethylstyrene as in Example 1, 42.5 g of the same technical divinylbenzene as in Example 1, 196 g of tributyl citrate 14.3 g of polystyrene and 2.2 g of benzoyl peroxide was employed as the monomer mixture. As a result, were obtained 197 g of porous cross-linked copolymer having a content of active chlorine atom of 5.01 mmole/g-dry resin, a water regain of 0.88 ml/g-dry resin and a total volume of micro pores having a diameter of from about 500 angstroms to about 3000 angstroms of 0.86 ml/g-dry resin.

EXAMPLE 4

The same procedure of Example 1 was repeated except that a monomer mixture consisting of 170 g of the same technical chloromethylstyrene as in Example 1, 50.2 g of the same technical divinylbenzene as in Example 1, 160 g of dioctyl azelate, 13.6 g of polystyrene and 2.2 g of benzoyl peroxide was employed as the monomer mixture. As a result, were obtained 220 g of a porous cross-linked copolymer having a content of active chlorine atom of 4.85 mmole/g-dry resin, a water regain of 0.48 ml/g-dry resin and a total volume of micro pores having a diameter of from about 500 angstroms to about 3000 angstroms of 0.43 ml/g-dry resin.

EXAMPLE 5

Into a four necked flask equipped with stirrer, thermometer and reflex condenser were added 100 g of the dried porous cross-linked copolymer obtained in Example 1, 143 g (i.e. 1.5 times by mole per active chlorine atom) of the copolymer, of ethyl ester of iminodiacetic acid, 430 g of water, 64 g of sodium bicarbonate. The reaction was carried out at a temperature of 80° C. for 16 hours with stirring. Then after cooling, the resin was separated from the aqueous phase by filtration and was washed with water. Then the resin thus separated was hydrolyzed with a 5 N aqueous solution of sodium hydroxide at a temperature of 80° C. for 16 hours. As a result, the chelating resin obtained had an ion exchange capacity of 5.01 meq/g-dry resin, a swelling ratio of 1.40, a water regain of 0.81 ml/g-dry resin, a total volume of micro pores having a diameter of from about 500 angstroms to about 3000 angstroms of 0.17 ml/g-dry resin, a strength of 92 and a reaction rate of 0.27 meq/ml-resin hr.

EXAMPLE 6

The same procedure of Example 5 was repeated except that 100 g of the dried porous cross-linked copolymer obtained in Example 2 were used instead of the dried porous cross-linked copolymer obtained in Example 1. As a result, the chelating resin obtained had an ion exchange capacity of 5.41 meq/g-dry resin, a swelling ratio of 1.38, a water regain of 1.21 ml/g-dry resin, a total volume of micro pores having a diameter of from about 500 angstroms to about 3000 angstroms of 0.40 ml/g-dry resin, a strength of 98 and a reaction rate of 0.28 meq/ml-resin hr.

EXAMPLE 7

The same procedure of Example 5 was repeated except that 100 g of the dried porous cross-linked copolymer obtained in Example 3 were used instead of the dried porous cross-linked copolymer obtained in Example 1. As a result, the chelating resin obtained had an ion exchange capacity of 5.01 meq/g-dry resin, a swelling ratio of 1.33, a water regain of 1.61 ml/g-dry resin, a total volume of micro pores having a diameter of from about 500 angstroms to about 3000 angstroms of 0.45 ml/g-dry resin, a strength of 98 and a reaction rate of 0.31 meq/ml-resin hr.

EXAMPLE 8

The same procedure of Example 5 was repeated except that 110 g of the dried porous cross-linked copolymer obtained in Example 4 were used instead of 100 g of the dried porous cross-linked copolymer obtained in Example 1. As a result, the chelating resin obtained had an ion exchange capacity of 4.70 meq/g-dry resin, a swelling ratio of 1.27, a water regain of 0.75 ml/g-dry resin, a total volume of micro pores having a diameter of from about 500 angstroms to about 3000 angstroms of 0.20 ml/g-dry resin, a strength of 98 and a reaction rate of 0.26 meq/ml-resin hr.

EXAMPLE 9

The same procedure of Example 1 was repeated except that a monomer mixture consisting of 190.3 g of technical chloromethylstyrene as in Example 1, 29.7 g of the same technical divinylbenzene as in Example 1, 165 g of dioctyl adipate, 10 g of polystyrene and 2.2 g of benzoyl peroxide.

As a result, were obtained 195 g of a porous cross-linked copolymer having a content of active chlorine atom of 5.30 mmole/g-dry resin, a water regain of 0.38 ml/g-dry resin, a total volume of micro pores having a diameter of from about 500 angstroms to about 3000 angstroms of 0.36 ml/g-dry resin.

Then, the same procedure of Example 5 was repeated except that 100 g of the dried porous cross-linked copolymer as obtained in the above described procedure and 150 g of ethyl ester of iminodiacetic acid were employed. As a result, was obtained a chelating resin having an ion exchange capacity of 5.83 meq/g-dry resin, a swelling ratio of 1.60, a water regain of 0.89 ml/g-dry resin, a total volume of micro pores having a diameter of from about 500 angstroms to about 3000 angstroms of 0.18 ml/g-dry resin and a strength of 87 and a reaction rate of 0.30 meq/ml-resin hr.

EXAMPLE 10

The same procedure of Example 1 was repeated except that 257.4 g of dioctyl sebacate were employed. As a result, were obtained 190 of a porous cross-linked copolymer having a content of active chlorine atom of 4.97 mmole/g-dry resin, a water regain of 0.36 ml/g-dry resin and a total volume of micro pores having a diameter of from about 500 angstroms to about 3000 angstroms of 0.33 ml/g-dry resin.

Then, the same procedure of Example 5 except that 100 g of the porous cross-linked copolymer as obtained in the above described procedure were employed. As a result, was obtained a chelating resin having an ion exchange capacity of 5.10 meq/g-dry resin, a swelling ratio of 1.39, a water regain of 1.79 ml/g-dry resin, a total volume of micro pores having a diameter of from about 500 angstroms to about 3000 angstroms of 0.48 ml/g-dry resin, a strength of 89 and a reaction rate of 0.26 meq/ml-resin hr.

EXAMPLE 11

The same procedure of Example 1 was repeated except that 114.4 g of dioctyl sebacate were employed instead of the 145.2 g of dioctyl sebacate. As a result, were obtained 189 g of a porous cross-linked copolymer having a content of active chlorine atom of 4.96 mmole/g-dry resin, a water regain of 0.34 ml/g-dry resin and a total volume of micro pores having a diameter of from about 500 angstroms to about 3000 angstroms of 0.33 ml/g-dry resin.

Then, the same procedure of Example 5 was repeated except that 100 g of the dried copolymer obtained in the above described procedure were employed. As a result, was obtained a chelating resin having an ion exchange capacity of 4.80 meq/g-dry resin, a swelling ratio of 1.45, a water regain of 0.82 ml/g-dry resin, a total volume of micro pores having a diameter of from about 500 angstroms to about 3000 angstroms of 0.17 ml/g-dry resin, a strength of 93 and a reaction rate of 0.28 meq/ml-resin hr.

COMPARATIVE EXAMPLE 1

The same procedure of Example 1 was repeated except that a monomer mixture consisting of 177.5 g of the same technical chloromethylstyrene as in Example 1, 42.5 g of the same technical divinylbenzene as in Example 1, 185 g of toluene and 2.2 g of benzoyl peroxide. As a result, were obtained 189 g of a porous cross-linked copolymer having a content of active chlorine atom of 5.00 mmole/g-dry resin, a water regain of 0.04 mg/g-dry resin, and a total volume of micro pores having a diameter of from about 500 angstroms to about 3000 angstroms of 0.05 ml/g-dry resin.

Then, the same procedure of Example 5 was repeated in order to produce a chelating resin except that 100 g of the porous cross-linked copolymer as obtained in the above described procedure instead of the dried porous cross-linked copolymer of Example 5. As a result, the hydrolized resin was extremely broken, and hardly any spherical resin without cracks could be obtained.

COMPARATIVE EXAMPLE 2

The same procedure of Example 1 was repeated except that a monomer mixture consisting of 181.4 g of the same technical chloromethylstyrene as in Example 1, 38.6 g of the same technical divinylbenzene as in Example 1, 185 g of toluene, 13.5 g of polystyrene and 2.2 g of benzoyl peroxide was employed as the monomer mixture. As a result, were obtained 193 g of a porous cross-linked copolymer having a content of chlorine atom of 4.98 mmole/g-dry resin, a water regain of 0.08 ml/g-dry resin and a total volume of micro pores having a diameter of from about 500 angstroms to about 3000 angstroms of 0.07 ml/g-dry resin.

Then, the same procedure of Example 5 was repeated in order to produce a chelating resin except that 100 g of the porous cross-linked copolymer as obtained in the above described procedure was used instead of the dried porous cross-linked copolymer of Example 5. As a result, was obtained a chelating resin having an ion exchange capacity of 5.20 meq/g-dry resin, a swelling ratio of 1.75, a water regain of 1.01 ml/g-dry resin, a total volume of micro pores having a diameter of from about 500 angstroms to about 3000 angstroms of 0.03 ml/g-dry resin, a strength of 43 and a reaction rate of 0.23 meq/ml-resin hr.

COMPARATIVE EXAMPLE 3

The same procedure of Example 1 was repeated except that 193.7 g of the same technical chloromethylstyrene as in Example 1 and 26.2 g of the same technical divinylbenzene as in Example 1 were employed. As a result, were obtained 190 g of the porous cross-linked copolymer having a content of active chlorine atom of 5.53 mmole/g-dry resin, a water regain of 0.39 ml/g-dry resin and a total volume of micro pores having a diameter of from about 500 angstroms to about 3000 angstroms of 0.37 ml/g-dry resin.

Then, the same procedure of Example 5 was repeated except that 100 g of the porous cross-linked copolymer as obtained in the above described procedure were employed. As a result, was obtained a chelating resin having an ion exchange capacity of 6.00 meq/g-dry resin, a swelling ratio of 2.00, a water regain of 0.90 ml/g-dry resin, a total volume of micro pores having a diameter of from about 500 angstroms to about 3000 angstroms of 0.20 ml/g-dry resin and a strength of 30.

COMPARATIVE EXAMPLE 4

The same procedure of Example 1 was repeated except that 100 g of dioctyl sebacate were employed. As a result, were obtained 197 g of the porous cross-linked copolymer having a content of active chlorine atom of 4.90 mmole/g-dry resin, a water regain of 0.17 ml/g-dry resin and a total volume of micro pores having a diameter of from about 500 angstroms to about 3000 angstroms of 0.16 ml/g-dry resin. Then the same procedure of Example 5 was repeated except that 100 g of the porous cross-linked copolymer as obtained in the above described procedure were employed. As a result, was obtained a chelating resin having an ion exchange capacity of 4.50 meq/g-dry resin, a swelling ratio of 1.75, a water regain of 0.80 ml/g-dry resin, a total volume of micro pores having diameter of from about 500 angstroms to about 3000 angstroms of 0.11 ml/g-dry resin, a strength of 80 and a reaction rate of 0.27 meq/ml-resin hr.

COMPARATIVE EXAMPLE 5

The same procedure of Example 1 was repeated except that 287 g of dioctyl sebacate were employed instead of the 145.2 g of dioctyl sebacate. As a result, were obtained 190 g of the porous cross-linked copolymer having a content of active chlorine atom of 4.98 mmole/g-dry resin, a water regain of 0.63 ml/g-dry resin and a total volume of micro pores having a diameter of from about 500 angstroms to about 3000 angstroms of 0.60 ml/g-dry resin. Then the same procedure of Example 5 was repeated except that 100 g of the porous cross-linked copolymer as obtained in the above described procedure were employed. As a result, was obtained a chelating resin having an ion exchange capacity of 4.99 meq/g-dry resin, a swelling ratio of 1.30, a water regain of 1.71 ml/g-dry resin, a total volume of micro pores having a diameter of from about 500 angstroms to about 3000 angstroms of 0.50 ml/g-dry resin, a strength of 63 and a reaction rate of 0.25 meq/ml-resin.

COMPARATIVE EXAMPLE 6

The same procedure of Example 1 was repeated except that 159 g of the same technical chloromethylstyrene as in Example 1 and 61 g of the same technical divinylbenzene as in Example 1 were employed. As a result, were obtained 196 g of the porous cross-linked copolymer having a content of active chlorine atom of 4.30 mmole/g-dry resin, a water regain of 0.34 ml/g-dry resin and a total volume of micro pores having a diameter of from about 500 angstroms to about 3000 angstroms of 0.30 ml/g-dry resin.

Then the same procedure of Example 5 was repeated except that 100 g of the porous cross-linked copolymer as obtained in the above described procedure were employed. As a result, was obtained a chelating resin having an ion exchange capacity of 4.00 meq/g-dry resin, a swelling ratio of 1.20, a water regain of 0.74 ml/g-dry resin, a total volume of micro pores having a diameter of from about 500 angstroms to about 3000 angstroms of 0.15 ml/g-dry resin and a strength of 99 and a reaction rate of 0.20 meq/ml-resin hr.

COMPARATIVE EXAMPLE 7

The same procedure of Example 5 was repeated except that 100 g of the porous cross-linked copolymer obtained in Example 1, 800 g of sodium iminodiacetic acid, 2000 ml of water and 100 g of sodium hydroxide were employed. As a result, was obtained a chelating resin having an ion exchange capacity of 1.03 meq/g-dry resin, a swelling ratio of 1.02, a water regain of 0.45 ml/g-dry resin and a total volume of micro pores having a diameter of from about 500 angstroms to about 3000 angstroms of 0.40 ml/g-dry resin.

COMPARATIVE EXAMPLE 8

The same procedure of Example 1 was repeated except that 22 g of polystyrene were employed instead of the 4.5 g of polystyrene. As a result, were obtained 197 g of the porous cross-linked copolymer having a content of active chlorine atom of 4.95 mmole/g-dry resin, a water regain of 0.37 ml/g-dry resin and a total volume of micro pores having a diameter of from about 500 angstroms to about 3000 angstroms of 0.35 ml/g-dry resin.

Then the same procedure of Example 5 was repeated except that 100 g of the porous cross-linked copolymer as obtained in the above described procedure were employed. As a result, was obtained a chelating resin having an ion exchange capacity of 4.98 meq/g-dry resin, a swelling ratio of 1.39, a water regain of 0.82 ml/g-dry resin, a total volume of micro pores having a diameter of from about 500 angstroms to about 3000 angstroms of 0.18 ml/g-dry resin and a strength of 50.

COMPARATIVE EXAMPLE 9

The same procedure of Example 1 was repeated except that 111.4 g of the same technical chloromethylstyrene as in Example 1, 47.3 g of the same technical divinylbenzene as in Example 1 were employed, and 61.2 g of styrene were additionally employed. As a result, were obtained 195 g of a porous cross-linked copolymer having a content of active chlorine atom of 3.14 mmole/g-dry resin, a water regain of 0.34 ml/g-dry resin and a total volume of micro pores having a diameter of from about 500 angstroms to about 3000 angstroms of 0.31 ml/g-dry resin.

Then the same procedure of Example 5 was repeated except that 100 g of the porous cross-linked copolymer obtained in the above described procedure were employed. As a result, was obtained a chelating resin having an ion exchange capacity of 3.15 meq/g-dry resin, a swelling ratio of 1.18, a water regain of 0.80 ml/g-dry resin, a total volume of micro pores having a diameter of from about 500 angstroms to about 3000 angstroms of 0.16 ml/g-dry resin and a strength of 95.

While the invention has been described in detail and with reference to specific embodiments thereof, it will be apparent to one skilled in the art that various changes and modifications can be made therein without departing from the spirit and scope thereof.

What is claimed is:

1. A method of producing a porous cross-linked copolymer of chloromethylstyrene and divinylbenzene consisting essentially of polymerizing a monomer mixture containing about 9.0 percent by mole to about 17.0 percent by mole, based on the total moles of all the monomers, of divinylbenzene represented by $X_m$, about 80–1.39 $X_m$ percent mole to about 98–1.71 $X_m$ percent by mole, based on the total moles of all the monomers, of chloromethylstyrene, about 50 percent by weight to about 120 percent by weight, based on the total weight of all the monomers, of a water-insoluble organic medium selected from the group consisting of dioctyl phthalate, dibutyl sebacate, dibutyl azelate, dibutyl adipate, tributyl citrate, dihexyl sebacate, dihexyl azelate, dihexyl adipate, dioctyl sebacate, dioctyl azelate and dioctyl adipate, about 1 percent by weight to about 7.5 percent by weight, based on the total weight of all the monomers, of a linear polymer which is soluble in the monomers and the water-insoluble organic medium, the linear polymer being selected from the group consisting of polystyrene, polymethyl methacrylate and polyvinyl acetate, and removing unreacted components from the polymerized product.

2. The method as claimed in claim 1, wherein the monomer mixture contains from about 10.0 percent by mole to about 16.0 percent by mole, based on the total moles of all the monomers, of the $X_m$, about 83–1.45 $X_m$ percent by mole to about 97–1.69 $X_m$ percent by mole, based on the total moles of all the monomers, of the chloromethylstyrene, about 60 percent by weight to about 100 percent by weight, based on the total moles of all the monomers, of the water-insoluble organic medium which precipitates the polymerized product and about 1 percent by weight to about 7.5 percent by weight, based on the total weight of all the monomers, of the linear polymer which is soluble in the monomers and the water-insoluble organic medium.

3. The method as claimed in claim 1 wherein the monomer mixture contains about 11.0 percent by mole to about 15.0 percent by mole, based on the total moles of all the monomers, of the $X_m$, about 85–1.50 $X_m$ percent by mole to about 96–1.60 $X_m$ percent by mole, based on the total moles of all the monomers, of the chloromethylstyrene, about 50 percent by weight to about 100 percent by weight, based on the total weight of all the monomers, of the water-insoluble organic medium which precipitates the polymerized product and about 1 percent by weight to about 7.5 percent by weight, based on the total weight of all the monomers, of the linear polymer which is soluble in the monomers and the water-insoluble organic medium.

4. A method of producing a porous iminodiacetic acid type chelating resin comprising reacting a porous cross-linked copolymer of chloromethylstyrene and divinylbenzene having a divinylbenzene unit represented by $X_m$ of from about 9.0 percent by mole to about 17.0 percent by mole based on the total moles of all the monomer units, a content of active chlorine atom of from about 5.25–0.08 $X_m$ mmole/g-dry resin to about 6.43–0.10 $X_m$ mmole/g-dry resin, a water regain of from about 0.10 ml/g-dry resin to about 1.20 ml/g-dry resin and a total volume of micro pores having a diameter of from about 500 angstroms to about 3000 angstroms of from about 0.10 ml/g-dry resin to about 1.20 ml/g-dry resin with an ester of iminodiacetic acid in an aqueous medium and then hydrolyzing the reaction product.

5. The method as claimed in claim 4, wherein the porous cross-linked copolymer has a $X_m$ of from about 10.0 percent by mole to about 16.0 percent by mole based on the total moles of all the monomers, a content of active chlorine atom of from about 5.44–0.08 $X_m$ mmole/g-dry resin to about 6.36–0.10 $X_m$ mmole/g-dry resin, a water regain of from about 0.20 ml/g-dry resin to about 1.0 ml/g-dry resin, a total volume of micro pores having a diameter of from about 500 angstroms to about 3000 angstroms of from about 0.20 ml/g-dry resin to about 1.00 ml/g-dry resin.

6. The method as claimed in claim 4, wherein the porous cross-linked copolymer has a $X_m$ of from about 11.0 percent by mole to about 15.0 percent by mole based on the total moles of all the monomer units, a content of active chlorine atom of from about 5.57–0.08 $X_m$ mmole/g-dry resin to about 6.30–0.09 $X_m$ mmole/g-dry resin, a water regain of from about 0.30 ml/g-dry resin to about 0.90 ml/g-dry resin, a total volume of micro pores having a diameter of from about 500 angstroms to about 3000 angstroms of from about 0.20 ml/g-dry resin to about 1.00 ml/g-dry resin.

* * * * *

UNITED STATES PATENT AND TRADEMARK OFFICE
CERTIFICATE OF CORRECTION

PATENT NO. : 4,358,546
DATED : November 9, 1982
INVENTOR(S) : Yamaguchi Naomi et al It is certified that error appears in the above—identified patent and that said Letters Patent is hereby corrected as shown below:

Col. 11, line 29    Delete "100 ml" and insert --1000 ml--

Signed and Sealed this

First Day of February 1983

[SEAL]

Attest:

GERALD J. MOSSINGHOFF

Attesting Officer    Commissioner of Patents and Trademarks